United States Patent [19]

Kammeraad

[11] 3,764,204

[45] Oct. 9, 1973

[54] VALVE GUIDE BORING FIXTURE

[75] Inventor: John H. Kammeraad, Holland, Mich.

[73] Assignee: K-Line Industries, Inc., Holland, Mich.

[22] Filed: Nov. 19, 1971

[21] Appl. No.: 200,492

[52] U.S. Cl. ............... 408/75, 408/93, 408/97, 408/103, 408/709
[51] Int. Cl. ............................................. B23b 41/12
[58] Field of Search .................. 408/708, 709, 75, 408/80, 81, 82, 103, 97, 1, 94, 93, 115; 90/12.5

[56] References Cited
UNITED STATES PATENTS

| | | | |
|---|---|---|---|
| 3,674,375 | 6/1972 | Reed et al. | 408/115 |
| 3,157,068 | 11/1964 | Rickert | 408/75 |

*Primary Examiner*—Gil Weidenfeld
*Attorney*—Price, Heneveld, Huizenga & Cooper

[57] ABSTRACT

A portable, U-shaped valve guide boring fixture to be mounted on and supported by a cylinder head for an internal combustion engine in order to guide the reworking of the valve guides in said internal combustion engine. The fixture comprises a support post on which are mounted two guide arms normal to the axis of said post. The second arm is fixedly mounted at one end of the post and includes spring seat engaging means. The first guide arm is slideably mounted and spring biased toward the second guide arm intermediate the ends of said post and includes valve seat engaging means comprising a pivotally mounted ball swivel guide having an axial bore to guide said reworking operation. The fixture is clamped over the spring seat and valve seat on the cylinder head, and a tapered alignment pin is inserted through said engaging means and said valve guide to bring the fixture into axial alignment with the valve guide by means of the pivotal action of the ball swivel guide. The fixture is then tightened into said aligned position and may be used to guide the boring and reaming operations, accomplished by means of hand tools, resulting in a reworked valve guide in accurate axial alignment with said valve seat.

17 Claims, 8 Drawing Figures

PATENTED OCT 9 1973

PATENTED OCT 9 1973 3,764,204
SHEET 2 OF 2
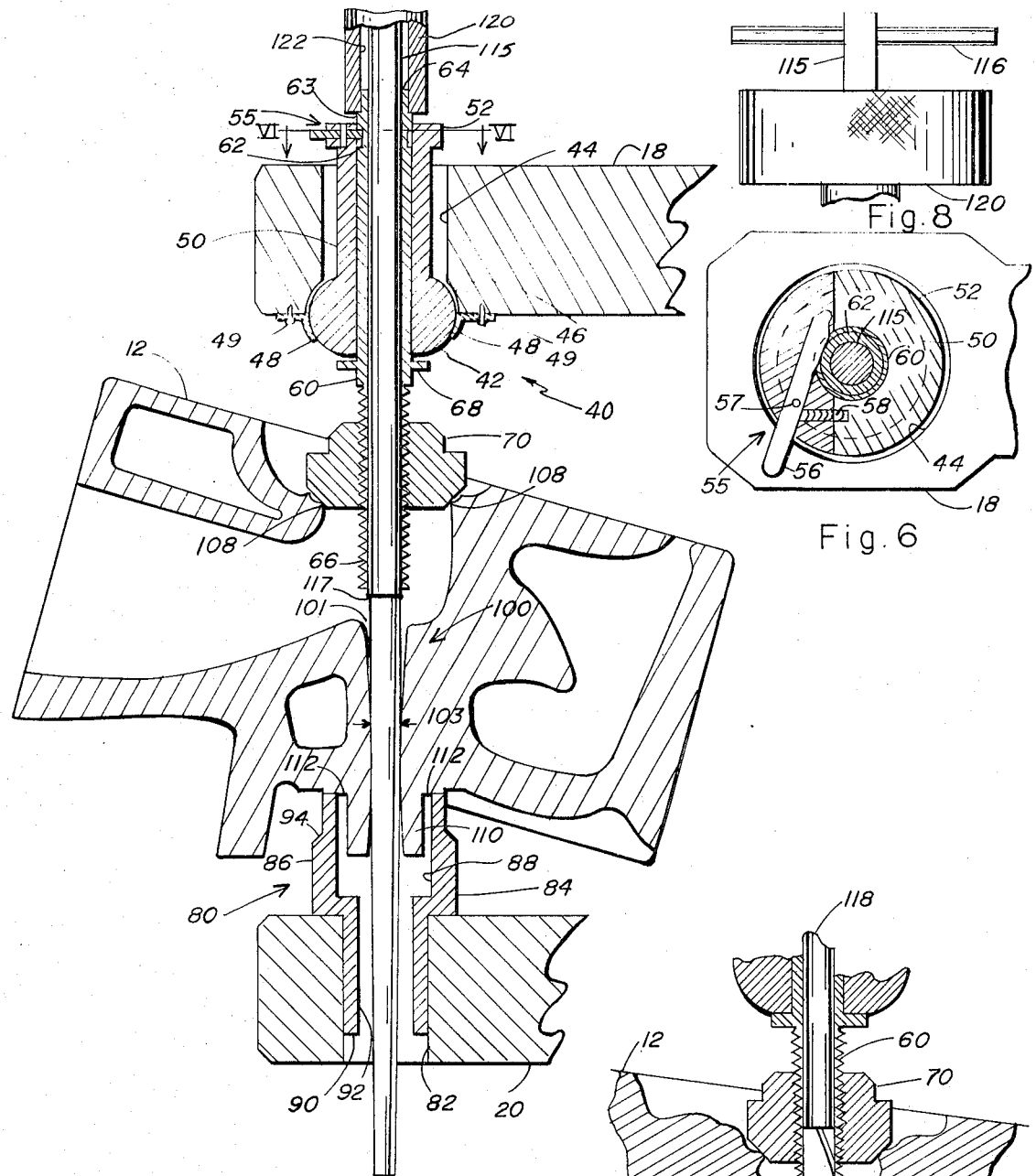
Fig. 3
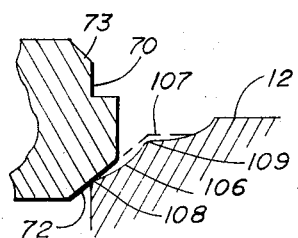
Fig. 5
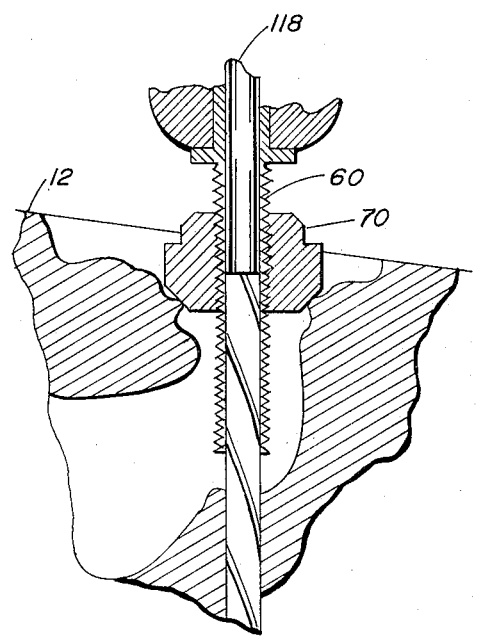
Fig. 8
Fig. 6
Fig. 4

VALVE GUIDE BORING FIXTURE

This invention relates to tools for the reworking of valve guides in combustion heads for internal combustion engines, and more particularly, to portable fixtures for guiding the reworking operations accomplished by means of hand tools.

BACKGROUND OF THE INVENTION

In the past, valve guide reworking operations have been accomplished by using either large, immovable machines requiring the precise mounting of cylinder heads on the machine at an angle in order to produce the proper reworking alignment, or small tools which could be mounted on the cylinder head. The large machines typically include a heavy base on which is mounted a drill press or other boring tool, thus necessitating the mounting of the cylinder head in a precise position to provide the proper alignment with the drill press. The cylinder head mounting on these machines is a tedious operation and one which, of necessity, must be repeated for each valve guide since the intake and exhaust valve guides in modern engines are often formed at opposing angles. See, e.g., U. S. Pat. No. 3,333,487.

The smaller tools, which could be mounted on the cylinder head when the cylinder head was in any position, were based on alignment principles which often produced inaccurate results. One such smaller tool utilized the principle of aligning the guide tool with the valve guide by means of the valve spring seat on the side of the cylinder head opposite the valve seat. However, since spring seats are cast roughly in the cylinder head casting process, and are normally not concentric with the valve guide axis, the alignment, which keyed on the location of the spring seats, caused the reworking operation based thereon to be extremely inaccurate. Other small tools for the reworking operations were devised but necessitated the mounting of the guide fixture on the cylinder head by means of one of the many holes provided in the cylinder head to mount the head on the engine block. Thus, the accuracy of these tools depended on the ability of the operator to firmly attach the guide tool to the cylinder head by means of these holes. If the mounting hole was in any way deformed or injured, the capability of aligning the tool properly was thereby reduced. See, e.g., U. S. Pat. No. 3,157,068.

The Applicants have conceived of a novel valve guide boring fixture which retains the portability attributes of previously available fixtures and, yet, eliminates the inaccuracies which have been encountered with this type of valve guide boring fixture. One of the important features of Applicants' novel invention is the capability of mounting Applicants' valve guide boring fixture rapidly on the cylinder head by means of a unique clamping action which secures the fixture by means of the valve seat and the spring seat, yet retains the alignment accuracy to produce an exact reworking of the valve guide. It is, therefore, an object of this invention to provide a small, compact, portable valve guide boring fixture which clamps on the cylinder head by means of the valve seat and spring seat, and yet may be aligned by means of a pivotally movable valve seat engaging means and locked in the aligned position to guide the subsequent boring operation. It is another object and feature of this invention to provide a valve guide boring fixture adapted to be aligned with the valve guide by means of the least worn portion of the valve seat and the least worn portion of the valve guide. It is yet another object of this invention to provide a valve guide boring fixture having the capability of accommodating all sizes of valve guides in all sizes of cylinder heads for internal combustion engines.

SUMMARY OF THE INVENTION

These and other objects and features of the present invention are accomplished by providing a portable tool for the reworking of valve guides for internal combustion engines, adapted to be mounted on and supported from a cylinder head from said engine during said reworking, comprising a support post, and first and second guide arms mounted on the support post, said arms extending from the post so as to form in combination with the post a generally U-shaped structure. The first guide arm includes means mounted at a distance spaced from the post for engaging a valve seat on the cylinder head, the valve seat engaging means including an axial bore adapted to guide various valve guide reworking tools. The valve seat engaging means is also pivotally mounted and movable with respect to the first guide arm in order to permit the axial bore to be moved into axial alignment with the valve guide to be reworked. In addition, the valve seat engaging means also include means for locking the valve seat engaging means in position with respect to the cylinder head and the valve guide once the bore has been axially aligned with the valve guide.

The second guide arm also includes means mounted at a distance spaced from the support posts which means are provided to engage the spring seat corresponding to the valve seat engaged by the valve seat engaging means on the first guide arm. Also included in the portable tool are means for altering the distance between the valve seat and spring seat engaging means on the first and second guide arms, respectively, in order to allow the portable tool to be clamped into engagement on the cylinder head prior to its alignment with the valve guide and the locking of the tool in the aligned position.

This invention will be readily understood by those skilled in the art from a study of the following description taken in conjunction with the drawings.

BRIEF DESCRIPTION OF THE DRAWINGS

FIG. 3 is a fragmentary, cross-sectional view of the valve guide boring fixture clamped in place on the cylinder head during the alignment step but prior to the tightening and locking step of the method;

FIG. 4 is a fragmentary, cross-sectional view of the valve guide boring fixture guiding the reaming operation;

FIG. 5 is an enlarged, fragmentary, cross-sectional view of the valve seat adaptor as supported by the valve seat, with the valve seat being shown in both its worn and original conditions;

FIG. 6 is a fragmentary, cross-sectional view of the boring guide securing means, taken along plane VI—VI of FIG. 3;

FIG. 8 is a fragmentary view of the remainder of the special wrench partially shown in FIG. 3, which wrench is used for the tightening and locking step of the method.

DESCRIPTION OF THE PREFERRED EMBODIMENT

Figure 1:
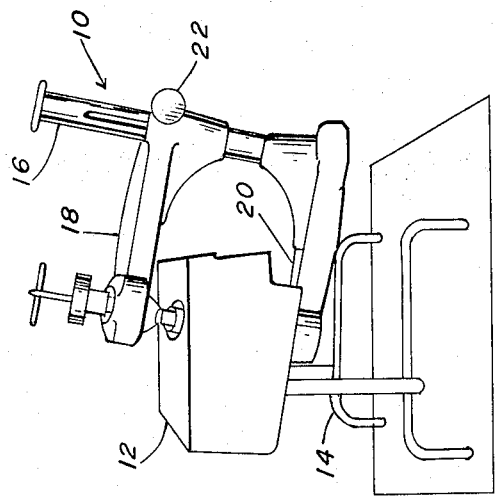
FIG. 1 is a perspective view of the valve guide boring fixture locked in place in alignment with a valve guide on the cylinder head.

Referring more particularly to the drawings, the valve guide boring fixture comprises a portable, U-shaped tool 10 designed to be mounted on and supported by a cylinder head 12 during the valve guide working processes, as shown in FIG. 1. The cylinder head 12, in turn, may be supported by any convenient means such as a stand 14 which provides sufficient clearance above and below the cylinder head in order to mount the valve guide boring fixture 10.

Figure 2:
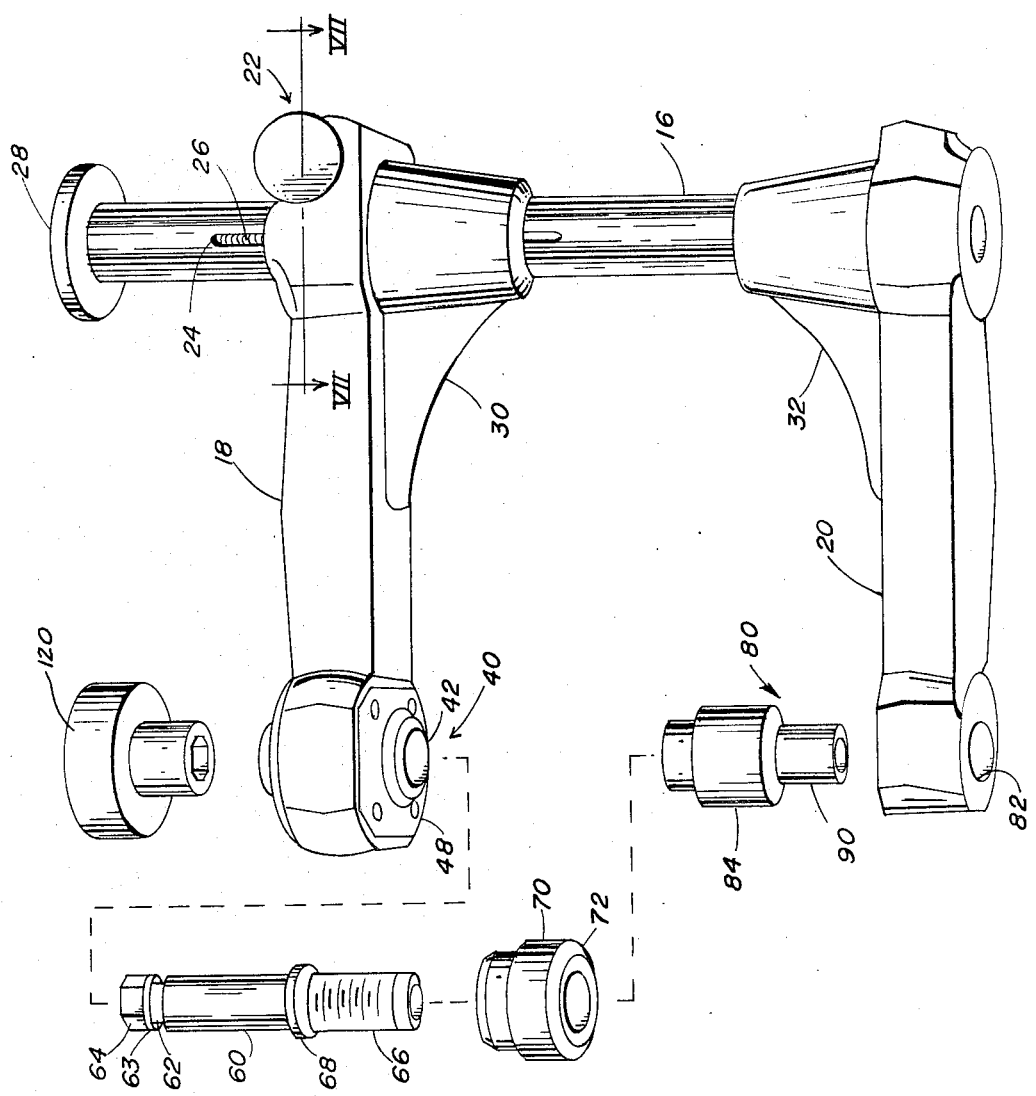
FIG. 2 is a partially exploded, perspective view of the valve guide boring fixture with the boring guide, valve seat adaptor, spring seat adaptor, and wrench shown in exploded positions.

As shown in FIG. 2, the valve guide boring fixture 10 comprises a hollow, tubular support post 16, a first guide arm 18 and a second guide arm 20. The second guide arm 20 is fixedly attached to one end of the support post 16 by means of a pin or the like and extends at a right angle from the axis of the support post. The first guide arm 18 also extends from the support post at a right angle and is slideably mounted on post 16. Guide arm 18 may be secured in various positions along the post 16 by means of one of many commonly used and well-known securing or clamping means 22 which function, when rotated, to engage the post 16. The operation of clamping means 22 will be more apparent from FIG. 7. Clamping members 33 and 34 are loosely and slideably fitted in a hole 35 bored through guide arm 18 so as to intersect at a right angle the central bore 19 in which support post 16 is slideably fitted. A screw 30, having an enlarged head 37 to facilitate tightening and a shoulder 38 is threadably engaged in member 33 and passes through member 34. Thus, when screw 36 is rotated by means of head 37, member 33 is drawn into contact with post 16 and member 34 is forced into contact with post 16 by shoulder 38, thereby securely clamping guide arm 18 in the desired position on post 16.

Figure 7:
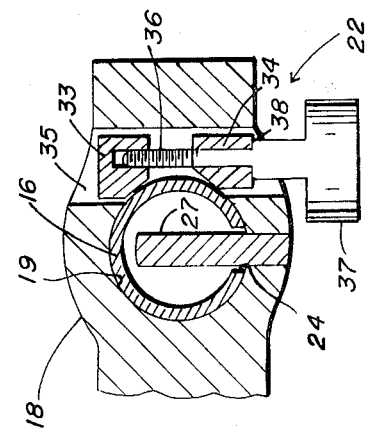
FIG. 7 is an enlarged, cross-sectional view of the first guide arm securing and biasing means taken along plane VII—VII of FIG. 2.

The support post 16 includes a slot 24 running parallel to the axis of the post along one side thereof in the area along which the first guide arm 18 is slideably mounted. A coil compression spring 26 is mounted within hollow portion of post 16 to bias the first guide arm 18 toward the second guide arm 20 when the securing or clamping means 22 is loosened. As shown in FIG. 7, the base of spring 26 abuts against a pin 27 which is force fitted or welded in a hole in guide arm 18, bored normally to the axis of hole 19, after guide arm 18 is slideably mounted on post 16. Thus, pin 27 provides a means for spring 26 to bias arm 18 toward arm 20 and also prevents arm 18 from rotating about post 16, thereby forcing arm 18 to slide in the same plane in which arm 20 is fixedly mounted. Support post 16 also includes an annular collar or flange 28 which is removeably threaded into the end of post 16 opposite the end to which the second guide arm is fixedly attached in order to provide an opening into which spring 26 may be mounted. One end of spring 26 thus abuts collar 28 when it is threaded in place on post 16. The first and second guide arms are braced by means of struts 30 and 32, respectively, in order to provide structural strength and integrity for the valve guide boring fixture.

Mounted at the ends of the first guide arm 18 and the second guide arm 20 are the valve seat engaging means 40 and the spring seat engaging means 80, respectively. The valve seat engaging means 40 comprises three primary components, including the ball swivel guide 42, the boring guide or drill bushing 60 and the valve seat adaptor 70. The spring seat engaging means 80 has one primary component which is the spring seat adaptor 84.

Referring now to FIG. 3, the valve seat and spring seat engaging means, 40 and 80, are shown in greater detail in their assembled positions in the first and second guide arms 18 and 20, respectively. The ball swivel guide 42 is mounted in a hole 44 having a corresponding ball-shaped contour 46 at the lower end thereof which receives the ball-shaped portion of the ball swivel guide 42. A plate 48, also contoured to the shape of a ball, retains the ball swivel guide in position in hole 44. Plate 48 is secured to guide arm 18 by fastening means 49. Guide 42 includes a cylindrical portion 50 which ends with an annular collar or flange 52 at the end opposite the ball portion of the ball swivel guide. The cylindrical portion 50 and annular collar 52 both have outside diameters smaller than the inside diameter of hole 44, thereby providing space in which the ball swivel guide may pivot. The ball swivel guide also includes an axial bore 54 which receives a boring guide 60 therein.

As shown in FIG. 6, the annular collar or flange 52 includes securing means which cooperate to secure the boring guide 60 in the ball swivel guide 42. The securing means 55 comprise a lever 56 pivotally mounted on a pin 57 and spring biased by means of a coil spring 58 into contact with an annular recess 62 on the upper end of boring guide 60. It will be apparent that unless the lever 56 is pivoted out of contact with the annular recess 62 and shoulder 63 formed thereby, the boring guide 60 will be retained within the ball swivel guide 42 since the shoulder 63 will at all times rest on a portion of the lever 56.

As noted above, the boring guide or drill bushing 60 is received in the axial bore of the ball swivel guide 42 and comprises a hollow tube having one end 64 formed to receive a wrench and the opposite end 66 threaded to receive the valve seat adaptor 70. Intermediate the ends 64 and 66 is an annular flange or collar 68 which forms a stop to prevent the further insertion of the boring guide 60 in the ball swivel guide 42. The outside diameter of the boring guide 60 matches the inside diameter of the axial bore 44 of the ball swivel guide 42, and the inside diameter of the guide 60 exactly corresponds to the outside diameter of the various reworking tools utilized to rework the valve guides in the cylinder heads. The threaded end 66 of the boring guide 60 is sufficiently long to reach immediately adjacent the valve seat end 101 of the valve guide 100 as shown in FIG. 3. It will be apparent that because of the length of the boring guide 60, the various reworking tools guided thereby will be securely supported to a point close to the valve guide 100 thereby preventing those tools from straying from the properly aligned axis through the valve guide during the reworking operation.

The boring guide 60 is formed from hardened, high carbon steel in order to be extremely resistant to wear produced by the repeated use of reamers and finishing tools during the life of the boring fixture. The steel used has a carbon content of between about 0.48 per cent and 0.53 per cent, and includes some manganese to increase its durability. One such steel is SAE No. 4150 steel. After machining to the desired form, the boring guides are hardened to further increase their durability.

Received on the threaded end 66 of the boring guide 60 is the valve seat adaptor 70 which is generally cylindrical and in-cludes an axial bore threaded to correspond to the threaded end 66 of boring guide 60. The valve seat adaptor 70 also includes at least one beveled or radius edge 72, as best seen in FIG. 5, which beveled edge 72 is one of the two alignment surfaces utilized with the valve guide boring fixture 10 when the fixture 10 is positioned and aligned on the cylinder head. As second beveled edge 73 may be formed on adaptor 70 in order to allow the reversal of the adaptor 70 on threaded end 66. When reversed the edge 73 will accommodate other smaller valve seats on different cylinder heads. As will be more fully described below, the beveled edge 72 or 73 of valve seat adaptor 70 rests on a portion 108 of the valve seat 106 which has the smallest diameter and circumference, such that the beveled edge 72 is supported on what approximates a circumferential knife edge, thereby allowing the valve seat adaptor to be easily pivoted and aligned by means of the ball swivel guide 42. As will be seen in FIG. 5, where a severely worn valve seat is depicted by the solid lines, the beveled edge is formed at an angle which would normally correspond to the angle of the new or unworn portion of a valve seat, shown by phantom lines 107. However, when the valve seat is severely worn as shown by the solid line in FIG. 5, the resting of the valve seat adaptor 70 on any other portion than the knife edge 108, which defines the smallest circumferential portion of the worn valve seat, would produce an inaccurate alignment, and thus an inaccurate reboring, since valve seats wear unevenly and non-uniformly. Thus, for instance, if the valve seat adaptor were to rest on the entire side of the valve seat between points 108 and 109, accurate results could not be produced since the wearing of the valve seat between points 108 and 109 cannot be uniformly and accurately predicted. However, since points 108 always remain in the same relative position with respect to the radial distance from the axis of the original valve guide, irrespective of the amount of wear during the life of the cylinder head, the beveled edges 72 resting on the smallest, circumferential knife edge 108 will uniformly and accurately produce axially aligned, rebored valve guides. That is, the points 108 will remain at the same perpendicular distance from the axis of the valve guide, although the position of the points 108 will vary along, and parallel to, the valve guide axis depending on the amount of valve seat wear. Consequently, the support of edges 72 and, therefore, valve seat adaptor 70 and boring fixture 10, on knife edge 108 will produce the same alignment and reboring results with respect to the axis of the original valve guide, regardless of the amount of wear to the valve seat 106. In addition, the support of the beveled edges 72 on the circumferential knife edge 108 greatly facilitates the alignment operation since there is but one circumferential edge or line of contact with the valve seat adaptor, thereby reducing the frictional contact and allowing easier movement of the valve seat adaptor with respect to the valve seat.

Mounted at the end of the second guide arm 20 in an axial bore or hole 82 is the spring seat engaging means 80 comprising a spring seat adaptor 84. The spring seat adaptor 84 comprises an adaptor cylinder 86 having a hole 88 bored at least partially therethrough along the axis of the cylinder. Hole 88 is large enough in diameter to approximately locate the spring seat adaptor 84 on the valve spring seat 110 of a cylinder head of an internal combustion engine, as shown in FIG. 3. The spring seat adaptor 84 also includes a coaxial cylindrical extension 90 formed integrally with the adaptor cylinder 86 and having an outside diameter of less than both the diameter of the adaptor cylinder 86 and the axial hole 88 bored partially through the adaptor cylinder. The outside diameter of the extension 90 corresponds to the inside diameter of the hole 82 bored through the second guide arm 20 thereby insuring the proper fit of the extension 90 in the hole 82. The cylindrical extension 90 also includes an axial hole 92 bored therethrough which has an inside diameter larger than the diameter of the various reworking tools utilized to rework the valve guides 100. The hole 92 connects with the hole 88 bored partially through the adaptor cylinder. The spring seat adaptor 84 may include beveled sides 94 which facilitate the fit of the spring seat adaptor around the spring seat 110 of the cylinder head in case any cylinder head castings should be immediately adjacent to the spring seat.

As shown in FIG. 3, when properly in position, the spring seat adaptor 84 rests on the flat shoulders 112 surrounding the spring seat 110 on the ends of the adaptor cylinder 86. Consequently, the spring seat adaptor 84, and thus the second guide arm 20, will be securely supported around, and approximately located over, the spring seat 110. As will be more fully described below, the alignment of the valve guide boring fixture does not depend on the accurate location of the spring seat adaptor 84 since holes 88 and 92 are of a large enough diameter to accommodate varied positions and angles of the tools guided by means of the ball swivel guide 42 and boring guide 60. Additionally, the configuration of the spring seat adaptor 84 does not require that the ends of the adaptor cylinder 86 rests squarely on the spring seat shoulders 112. It is sufficient if one edge of the adaptor cylinder 86 is in contact with only a portion of the spring seat shoulder 112 since the diameter of the holes 88 and 92 are sufficient to accommodate varied angles of the valve guide boring fixture and the reworking tools when the fixture is clamped in position on the cylinder head.

The spring seat adaptor 84 is formed from steel which is softer and less durable than that used to form the boring guide 60. Thus, the steel is such that if the adaptor 84 is not exactly centered on the spring seat 110 during the reaming or reboring operation, and the reamer can safely ream a portion of adaptor 84 without disturbing the axial alignment of the fixture as a whole. One such steel is SAE No. B1113 steel.

Referring now to FIGS. 3, 4 and 8, two of the various valve guide reworking tools are depicted. In FIG. 3, a tapered alignment pin 115 having a handle 116 is shown as it is used to align the valve guide boring fixture 10 with the valve guide 100 in cylinder head 12. The tapered pin 115 is inserted through a specially designed, knurled socket wrench 120, having a central bore 122 and a socket matching the end 64 of boring guide 60, and through the boring guide 60, the valve guide 100, and the valve seat adaptor 84 in succession. The pin 115 is not tapered over its upper one-half, but is matched to the inside diameter of boring guide 60 such that no play results. The tapered portion begins at section 117, where the pin has a diameter slightly less than the inside diameter of the boring guide 60, and ends at the end opposite the end containing handle 116, or the lower end, where the pin has a diameter less than the diameter of the original and unworn valve guide 100. Thus, the tapered pin 115 tapers from a size corresponding to slightly less than the desired size of the reworked valve guide, at section 117, to a size less than the size of the original, unworn valve guide, at the lower end. Consequently, when the tapered pin 115 is inserted through the boring guide 60, a point intermediate the ends of the pin 115 will come to rest at the least worn intermediate portion 103 of the valve guide 100, thereby automatically bringing the boring guide 60 into axial alignment with the axis of the original valve guide, which axis is centered in the least worn portion 103, by means of the ball swivel guide 42. As will be more fully described below in the description of the method, the proper alignment is accomplished by the swiveling of the ball swivel guide 42, which is supported by the valve seat adaptor 70 resting on knife edge 108, which swivel action aligns the boring guide 60 with the axis of the least worn portion of the valve guide 103. The alignment is thus basd on a two-point contact at points 108 and 103, which points will be uniformly available in most cylinder heads, no matter how badly worn the valve seats or the valve guides are.

FIG. 4 depicts a portion of the valve guide boring fixture when it is locked in place in the aligned position by tightening the left-handed threads 66 by means of wrench 120 following alignment by means of the tapered alignment pin 115. After the alignment pin 115 and wrench 120 are removed, the boring tool or reamer 118 may be inserted through the boring guide 60 to bore the worn valve guide 100 to the desired size prior to the insertion of a bronze or cast iron valve guide sleeve or an oversized valve stun. It will be apparent that, due to the secure and adequate support supplied by the properly aligned boring guide 60, the boring operation, utilizing a boring tool 118, will produce a rebored valve guide which is in exact axial alignment with the valve seat and the least worn portion of the valve guide no matter how badly worn the valve seat or valve guide is.

Although exact embodiments of the boring guide 60, valve seat adaptor 70, and spring seat adaptor 84 have been described, it will be apparent that other sizes and configurations of these elements of the valve guide boring fixture may be utilized in order to accommodate the various sizes of valve guides in various internal combustion engines. Thus, if the valve guide is larger, a matched set of spring seat adaptor, valve seat adaptor and boring guides having an inside diameter of the axial bore corresponding to the larger size valve guide may be utilized. Similarly, the reworking tools including the tapered alignment pin 115 and boring tool or reamer 118 may be provided in various sizes to accommodate the various sizes of valve guides.

DESCRIPTION OF THE METHOD

Applicants' novel and unique valve guide boring fixture may be utilized in a method of reworking the valve guides of an internal combustion engine cylinder head comprising the following described steps. The first step is the selection of the smallest valve seat adaptor 70 which will rest on only the smallest diameter and circumferential portion of the worn valve seat, which portion is the circumferential knife edge 108 described above. The portion 108 will be the least worn portion of the valve seat and, no matter how badly worn the valve seat is, the adaptor 70 will be in a uniform position since the valve seat adaptor will rest only on the innermost edge of the valve seat. The second step of the method is the selection of a boring guide 60 having an inside diameter corresponding to the desired inside diameter of the valve guide after the boring operation and prior to the insertion of a brass or cast iron sleeve therein. The selection of the boring guide 60 will determine the sizes of the various reworking tools to be utilized in the process of reworking the valve guide, since the outside diameters of those tools correspond to the inside diameter of the hole or bore running along the axis of the boring guide 60.

Following the selection of the boring guide 60, the properly selected valve seat adaptor 70 is secured to the boring guide by means of the matching threads on the end of the boring guide 66 and in the axial bore within the valve seat adaptor 70, after which the boring guide is inserted in the axial bore of the ball swivel guide 42 where it is retained in position by lever 56. Care should be taken, where possible, to fabricate and secure together the adaptor 70 and guide 60 such that the lower extremity of guide 60 will be positioned as closely as possible to the upper extremity of the valve guide when the reaming steps are begun. Such positioning, as will be readily apparent to those skilled in the art, will enhance the accuracy with which the reboring steps can be carried out.

The third step of the method is to select the proper spring seat adaptor 84 which is large enough to fit over and around the spring seat 110 of the cylinder head, thereby insuring the secure positioning of the spring seat adaptor on the shoulder 112 of the spring seat. The spring seat adaptor 84 is then inserted in the hole provided in the second guide arm 20.

Following the selection of the proper valve seat and spring seat engaging means, the valve guide boring fixture or tool is mounted on the cylinder head by fitting the spring seat adaptor 84 over the spring seat 110, approximately centering the valve seat adaptor 70 over the valve seat 106, and allowing the coil spring 26 to bias the first guide arm, and thus the valve seat adaptor 70, into contact with the valve seat, thereby clamping the entire boring fixture 10 on the cylinder head 12. At this point, the boring fixture 10 is clamped in position on the cylinder head 12 by tightening knob 22 although, at this point, the fixture is only lightly clamping the cylinder head between the engaging means 40 and 80 mounted on the first and second guide arms.

The next step in the method is to align the boring guide 60 with the axis of the original valve guide by means of the tapered alignment pin 115 inserted through the wrench 120, the boring guide 60, the valve guide 100 and the spring seat adaptor 84 such that an accurate two-point alignment is obtained. The accurate two-point alignment is obtained by allowing the tapered alignment pin 115 to contact the least worn portion 103 of the valve guide 100 and approximately centering the valve seat adaptor 70 on the valve seat by means of the swiveling action of the ball swivel guide. After the taper pin contacts the least worn portion 103, the taper pin 115 is forced tightly into the valve guide, thereby shifting the position of the valve seat adaptor on the smallest circumferential portion 108 of the valve seat 106, thereby bringing the boring guide 60 into direct axial alignment with the axis of the least worn portion 103 of the valve guide 100. Thus, an accurate two-point alignment is obtained by centering the valve seat adaptor 70 on the first of the two points, i.e., the knife edge 108, thereby bringing the boring guide 60 into direct axial alignment with axis of the original valve guide by means of the second of the two points, i.e., the least worn portion 103 of the valve guide 100. Following the alignment by means of the tapered alignment pin 115, the boring fixture 10 is locked into the aligned position by tightening the valve seat adaptor against the valve seat and the spring seat adaptor against the spring seat shoulder 112 with thw wrench 120 by means of the threads 66 provided on the end of the boring guide 60. Normally, the wrench 120 provided with the boring fixture 10 will be utilized to tighten and lock the boring fixture in the aligned position, however, the boring guides end 64 is susceptible of being tightened by means of any wrench.

Following the tightening of the tool in the aligned position, the tapered alignment pin 115 is removed and the reworking of the valve guide may be accomplished by means of the various reamers and finish reamers 118 corresponding to the inside diameter of the boring guide. These reamers may be dropped through the valve guide and out the bottom thereof through the apertures in members 20 and 84. Following the reaming operation, the valve guide boring fixture 10 may be loosened by means of loosening the threaded engagement of the boring guide with the valve seat adaptor and removing the tool from the cylinder head.

Normally, the valve guide boring fixture 10 will be used to rework the old and worn valve guide 100 to produce a valve guide having a diameter slightly larger than the original diameter of the valve guide. Following the reworking and reboring accomplished by means of Applicants' novel and unique boring fixture 10, a bronze or cast iron valve sleeve will normally be inserted in the valve guide. Thus, the insertion of a sleeve will reproduce the original valve guide dimensions in exact axial alignment with the valve seat.

Applicants' novel valve guide boring fixture 10 is thus seen to provide a method for rapidly and accurately reboring a worn valve guide such that the reworked valve guide is in direct, and completely accurate, axial alignment with the valve seat. When a bronze or cast iron valve sleeve is subsequently inserted in the rebored valve guide, the sleeve will be accurately aligned with the valve seat, thereby insuring the efficient and proper functioning of the valve in the reworked cylinder head.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. A portable tool for the reworking of valve guides of an internal combustion engine adapted to be mounted on and supported from a cylinder head from said engine during said reworking comprising:

a post;

first and second guide arms mounted on said post, said arms extending from said post so as to form in combination with said post a generally U-shaped structure;

means mounted at a distance spaced from said post on said first arm for engaging a valve seat on said cylinder head, said valve seat engaging means including an axial bore adapted to guide valve guide reworking tools, said valve seat engaging means being pivotally moveable with respect to the arm on which it is mounted to permit said axial bore to be moved into axial alignment with the valve guide;

means mounted at a distance spaced from said post on said second arm for engaging the spring seat corresponding to said valve seat; and means for altering the distance between said engaging means and for locking said valve seat engaging means in position with respect to said cylinder head once the bore thereof has been axially aligned with the valve guide; said axial bore in said valve seat engaging means having a size mating with and receiving an at least partially tapered, generally rectilinear, alignment tool extending therethrough and through said spring-seat engaging means in said second arm; said alignment tool adapted to extend through, be pivotally adjusted via said valve seat engaging means with respect to, and engage the least worn portion of the side walls of the valve guide corresponding to said valve seat in said cylinder head intermediate the ends of said valve guide when said portable tool is mounted on said cylinder head; the contact of said valve seat engaging means with said valve seat and said alignment tool with said valve guide providing a spaced, two-point contact for axially aligning said portable tool with said valve seat and guide such that other reworking tools may be used to rework said valve guide via said axially aligned portable tool following the removal of said alignment tool therefrom.

2. A portable tool in accordance with claim 1 wherein said valve seat engaging means on said first guide arm include a ball swivel guide having an axial hole bored therethrough, said ball swivel guide being swivelly moveable in a correspondingly shaped aperture in said first guide arm such that said axial alignment with said valve guide to facilitate said reworking of the valve guide may be attained.

3. A tool in accordance with claim 2 wherein said ball swivel guide includes a spherical portion and a cylindrical extension formed integrally therewith along an axis of said spherical portion, said ball swivel guide having an axial hole bored centrally therethrough along the common axis of said spherical portion and said cylindrical extension; said cylindrical extension also including an annular collar formed integrally therewith at the end opposite said spherical portion.

4. A portable tool for the reworking of valve guides of an internal combustion engine adapted to be mounted on and supported from a cylinder head from said engine during said reworking comprising:

a post;

first and second guide arms mounted on said post, said arms extending from said post so as to form in combination with said post a generally U-shaped structure;

means mounted at a distance spaced from said post on said first arm for engaging a valve seat on said cylinder head, said valve seat engaging means including an axial bore adapted to guide valve guide reworking tools, said valve seat engaging means being pivotally moveable with respect to the arm on which it is mounted to permit said axial bore to be moved into axial alignment with the valve guide;

means mounted at a distance spaced from said post on said second arm for engaging the spring seat corresponding to said valve seat; and means for altering the distance between said engaging means and for locking said valve seat engaging means in position with respect to said cylinder head once the bore thereof has been axially aligned with the valve guide; said valve seat engaging means on said first guide arm including a ball swivel guide having an axial hole bored therethrough, said ball swivel guide being swivelly moveable in a correspondingly shaped aperture in said first guide arm such that said axial alignment with said valve guide to facilitate said reworking of the valve guide may be attained; said ball swivel guide including a spherical portion and a cylindrical extension formed integrally therewith along an axis of said spherical portion, said ball swivel guide having an axial hole bored centrally therethrough along the common axis of said spherical portion and said cylindrical extension; said cylindrical extension also including an annular collar formed integrally therewith at the end opposite said spherical portion; said valve seat engaging means on said first guide arm also include a boring guide received in the axial bore of said ball swivel guide, said boring guide comprising a hollow tube having one end formed to receive a wrench, the opposite end threaded, and an annular collar formed integrally about said tube intermediate said ends, said collar forming a stop preventing the further insertion of said boring guide in said ball swivel guide, the outside diameter of said tube formed to match the inside diameter of said hole in said ball swivel guide and the inside diameter of said tube corresponding to the outside diameter of the various tools utilized to rework said valve guides.

5. A portable tool in accordance with claim 4 wherein said boring guide has a length sufficient to reach closely adjacent the valve guide end closest to said valve seat in said cylinder head, when said tool is properly in position on said head, such that support is provided for said reworking tools closely adjacent said end of said valve guide.

6. A portable tool in accordance with claim 5 wherein said annular collar on said ball swivel guide includes securing means which cooperate to secure said boring guide in said cylindrical member.

7. A portable tool in accordance with claim 6 wherein said securing means comprise a lever biased to remain in contact with an annular recess formed in said boring guide such that said boring guide is held in position within said ball swivel guide unless said lever is withdrawn from said recess.

8. A portable tool in accordance with claim 5 wherein said threads on said boring guide are adapted to receive a valve seat adaptor, said adaptor being generally cylindrical with a hole bored along the axis thereof, said hole threaded to receive said threaded end of said boring guide, said adaptor also having at least one beveled edge to correspond to the beveled sides of a valve seat on a cylinder head of an internal combustion engine.

9. A portable tool in accordance with claim 8 wherein said engaging positioning and guiding means on said second guide arm includes a spring seat adaptor comprising an adapter cylinder having a hole bored at least partially therethrough along the axis of said cylinder, said hole being large enough in diameter to approximately locate said spring seat adaptor on a valve spring seat of a cylinder head of an internal combustion engine, said spring seat adaptor also including a coaxial cylindrical extension formed integrally with said adaptor cylinder having an outside diameter of less than both the diameter of said adaptor cylinder and said hole bored partially through said adaptor cylinder, said outside diameter corresponding to the interior diameter of a hole bored through said second guide arm to receive said coaxial cylindrical extension, said cylindrical extension having a hole bored coaxially therethrough, which hole has an inside diameter larger than the diameter of the various tools utilized to rework said valve guides, said hole connecting with said hole bored partially through said adaptor cylinder.

10. A portable tool in accordance with claim 9 wherein said means for altering the distance between said engaging means comprise said first guide arm slideably mounted on said support post.

11. A portable tool in accordance with claim 10 wherein said support post includes an annular flange formed integrallly therewith at one end to prevent said first guide arm from sliding off said post and a slot formed longitudinally along said post in which a spring is mounted to bias said first guide arm toward said second guide arm, said first guide arm including securing means to secure said first guide arm at various positions along said post, said second guide arm being fixedly mounted on the end of said post opposite said annular flange.

12. A portable tool in accordance with claim 11 wherein said tools for the reworking of said valve guides utilized with said portable tool include a tapered alignment tool provided to align said engaging means on said first and second guide arms with said valve guide, said alignment tool being tapered from a portion at one end, having a diameter corresponding to the inside diameter of said boring guide, to a diameter less than the diameter of the original valve guide at the opposite end; a socket wrench for tightening said portable tool in place on said cylinder head corresponding to the end of said boring guide formed to receive said wrench, said wrench including an enlarged head to facilitate said tightening and a hole bored axially through said wrench such that said reworking tools may be passed therethrough; and a reamer having an outside diameter corresponding to the inside diameter of said boring guide.

13. The tool as set forth in claim 15 which further comprises means for effecting axial alignment of said axial bore and the least worn portion of the valve guide to be reworked.

14. The tool as set forth in claim 15 which includes a continuous bore through said guide arms and said engaging means whereby reworking tools may be inserted into a valve guide to be reworked at one extremity thereof and removed from the other extremity thereof while said tool is in position on the cylinder head.

15. A portable tool for the reworking of valve guides of an internal combustion engine adapted to be mounted on and supported from a cylinder head from said engine during said reworking comprising:

a post;

first and second guide arms mounted on said post, said arms extending from said post so as to form in combination with said post a generally U-shaped structure;

means mounted at a distance spaced from said post on said first arm for engaging a valve seat on said cylinder head, said valve seat engaging means including an axial bore adapted to guide valve guide reworking tools, said valve seat engaging means being pivotally moveable with respect to the arm on which it is mounted to permit said axial bore to be moved into axial alignment with the valve guide;

means mounted at a distance spaced from said post on said second arm for engaging the spring seat corresponding to said valve seat; and means for altering the distance between said engaging means and for locking said valve seat engaging means in position with respect to said cylinder head once the bore thereof has been axially aligned with the valve guide; one of said guide arms being slideably mounted on said post and which further comprises selectively manipulatable means for preventing such sliding movement.

16. The tool as set forth in claim 15 wherein said locking means comprises means for forcibly varying the distance between one of said arms and one of said engaging means.

17. The tool of claim 15 wherein said first arm is slideably mounted on said post; said post including means for biasing said first arm toward said second arm and means for clamping said first arm to said post in selected positions therealong.

* * * * *